Dec. 26, 1939.   P. FIREMAN   2,184,738
PRODUCTION OF IRON OXIDE
Filed July 23, 1938
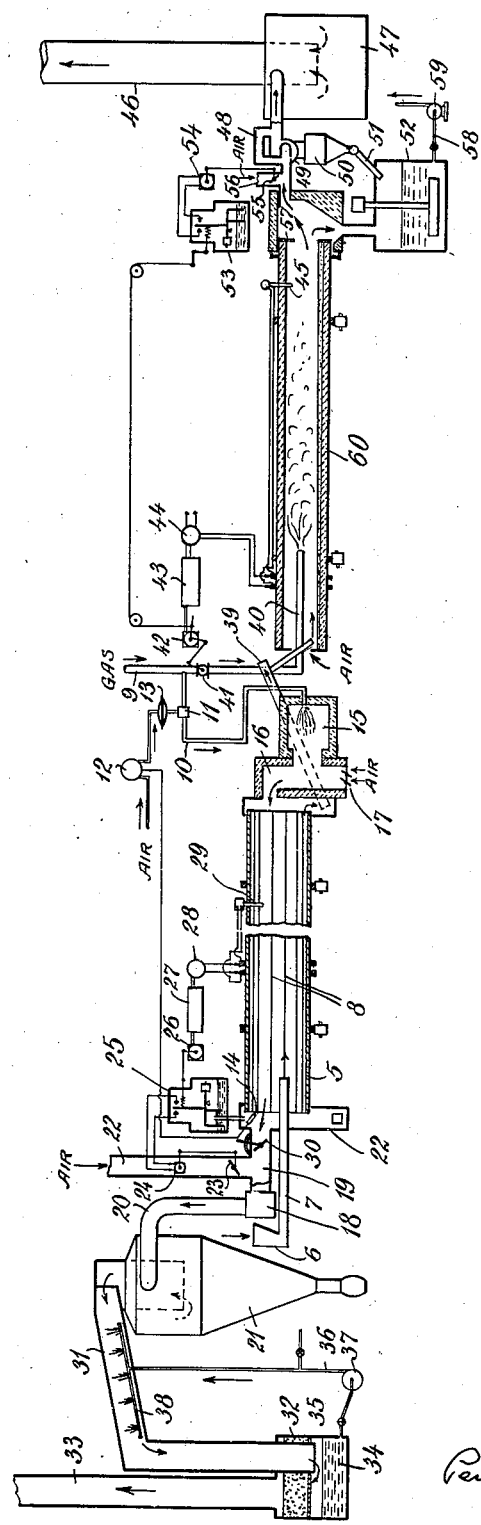
INVENTOR
Peter Fireman
BY
ATTORNEYS Patented Dec. 26, 1939

2,184,738

UNITED STATES PATENT OFFICE 2,184,738

PRODUCTION OF IRON OXIDE

Peter Fireman, Lambertville, N. J., assignor to Magnetic Pigment Company, New York, N. Y., a corporation of New York Application July 23, 1938, Serial No. 220,842

1 Claim. (Cl. 23—200)

This invention relates to the production of red iron oxide of predetermined shade from commercial copperas, and particularly to a method of drying and calcining copperas in a continuous operation to produce an oxide of satisfactory quality containing not more than .05% of manganese.

Commercial copperas is iron sulphate carrying 7 molecules of water of crystallization ($FeSO_4.7H_2O$). There is always present a small amount of manganese sulphate ($MnSO_4$) which tends to decompose when the copperas is calcined, to form manganese dioxide in the product. For many purposes the presence of manganese is detrimental. So long as the manganese remains in the form of sulphate, it may be washed from the iron oxide product, which is insoluble in water, but manganese in the insoluble form of manganese dioxide cannot be removed from the product by washing.

Heretofore, red iron oxide of low manganese content has been manufactured from copperas only by a batch method, i. e., the copperas previously treated to remove a part of the water of crystallization is placed in a cylindrical rotating furnace and heated with a gas or fuel oil flame for a time sufficient to decompose the iron sulphate. Sulphur dioxide and sulphur trioxide are removed, and the material is converted into iron oxide. Control of the batch operation is fairly simple, and the product is discharged when the proper color has been attained. Batch operations are, however, relatively expensive, with resulting increased cost of the product.

It has not been commercially practicable heretofore to conduct the drying or dehydrating and the calcining operations in a continuous manner, wherein the material flows from the source to the delivery point without interruption. Such an operation requires the control of numerous factors which affect the result. For example, in calcining the dehydrated copperas, it is necessary to maintain uniformity in respect to the quantity of material treated and the time of such treatment. This, in turn, depends upon uniformity of feeding of the dehydrated material, and entails a uniform and constant rate of drying. Other factors will be discussed in more detail in the following description.

It is the object of the present invention to provide a method of drying and calcining commercial copperas which is continuous in the sense that the raw material enters the dryer and is delivered uniformly and without interruption to the calciner, where it is subjected to further heat and is discharged at substantially the rate of feeding as the iron oxide product.

Another object of the invention is the provision of a method in which the initial drying is carried out uniformly to remove 6 of the 7 molecules of water, affording an intermediate product designated as "1 mole" iron sulphate, which is fed continuously and uniformly to the calciner.

Another object of the invention is the provision of a method in which commercial iron sulphate or copperas is converted in a continuous operation into red iron oxide containing not more than .05% of insoluble manganese, the remaining manganese present being retained in soluble form so that it can be washed from the product.

A further object of the invention is the provision of a method in which the raw material, copperas, is subjected to counter-current flow of heat during the drying stage and thereafter to concurrent heating during the calcining stage, with effective control of the numerous factors and particularly the temperature gradients in the dryer and calciner, so as to accomplish the desired result.

Other objects and advantages of the invention will be apparent as it is better understood by reference to the following specification and the accompanying drawing, which illustrates diagrammatically the successive operations to which the raw material is subjected.

In carrying out the invention, I employ inclined cylindrical rotating furnaces through which the material is adapted to flow continuously, a suitable conveyor being provided between the furnaces to feed the material from one to the other. In the first furnace or dryer, copperas, which is supplied at a uniform rate from a suitable source, travels countercurrent to the flame and hot gases resulting from the combustion of a suitable fuel such as gas. The dehydrated material, which has lost 6 of its 7 molecules of water, is then fed uniformly and continuously to the second furnace or calciner, where it is subjected to heat supplied by the flame and hot gases from the combustion of a suitable fuel such as gas. In the calciner, the flame and gases travel concurrently with the material treated. By suitable regulation of the temperatures in the dryer and calciner, it is possible to complete the operation successfully and to produce a product of satisfactory color having not more than .05% of manganese in insoluble form. The product is then washed to remove the soluble manganese and other undesirable and contaminating materials.

Copperas contains 45.29% of water of crystallization. If heated rapidly, it melts in this water and becomes unmanageable due to caking and sticking. It is necessary, therefore, to control the initial drying operation so as to remove the major part of the water while leaving the material fine and soft. This is accomplished by warming the copperas gently in air in which the relative humidity is closely controlled. For example, if too little air is used for drying, or if heat is applied too rapidly, or both, the copperas will melt. If too much air is used, or too little heat is applied, or both, much of the dried copperas is blown out of the dryer, with resulting serious loss. I have discovered that to secure effective drying without either of the difficulties mentioned, it is necessary to maintain temperatures so that the air leaving the dryer is at 120° to 130° F., depending upon the type of copperas being dried. The temperatures in various parts of the dryer must remain constant. The temperature of the air leaving the dryer is controlled by means of an automatic gas controller with a "droop corrector" to offset changes in fuel gas composition or changes in the quantity of gas required. The point of control is the duct leading from the charge breeching to the cyclone. At this point, the temperature is maintained automatically at 120° to 130° F., within one degree.

The quantity of air admitted to the dryer must be constant. An automatic draft control device is employed to ensure accuracy in the feeding of the air. This device also corrects for changes in draft due to wind, etc. The quantity of air supplied affects the temperature at the end of the dryer where the material is discharged. This temperature is maintained at 200° to 250° F., as measured by an air thermometer located in the stream of dried copperas leaving the dryer. When the copperas is heated under the conditions mentioned, ⁶⁄₇ of its moisture is driven off without encountering the difficulties mentioned. The draft required is usually 0.2 to 0.5 inch of water in the air exit flue.

The quantity of air supplied also affects the rate of discharge of the dried material. An excess of air causes an excess of dust which blows out of the charge end, thus reducing the amount of material available at the discharge end. Also, the quantity of air controls the dewpoint at the air exit flue. If a suitable quantity of air is used, the dewpoint is low, and the flues remain clear. If too little air is used, the dewpoint is high, and moisture will condense out of it and cause accumulations of dust in the flue. Since a high dewpoint is desirable in the dryer proper, and undesirable in the flue, the dewpoint is dropped in the flue by adding warm air at the point where the gases leave the dryer and enter the flue.

In the calciner, the material flows continuously from the feeding to the discharge end, but a substantial body of the material is retained in the calciner by the provision at the discharge end of a dam consisting of a circular plate with an opening at the center thereof. It is necessary to maintain a bed of material in order that overheating and consequent decomposition of manganese sulphate may be avoided. The material is heated by a flame and hot gases travelling concurrently with the material. In the rotating furnace, the material is constantly agitated so that fresh material comes into contact with the flame and hot gases only momentarily, the temperature to which the material is raised being thus limited to substantially 1400° F. The air for combustion is drawn in by means of a stack, the amount of air being regulated by a draft damper which is automatically controlled to ensure maintenance of the desired conditions.

The amount of fuel gas supplied to the calciner is accurately controlled by a potentiometer controller which actuates a motor driven gas valve which is in turn controlled by a thermocouple located inside the brick lining of the calciner.

The hot iron oxide is discharged continuously, and in quantity corresponding to that of the material entering at the feed end of the dryer, into a wash tank containing water which dissolves any soluble compound such as manganese sulphate. The iron oxide product may be recovered from the water in any suitable manner. Owing to the effect of control of the drying and calcining operations, the product will be found to be quite free from insoluble manganese compounds, that is, manganese will not exceed .05%.

The gases from the calciner, consisting of sulphur dioxide and sulphur trioxide which result from decomposition of the sulphate, pass through a cyclone in which any dust is separated, and thence to a stack from which the gases are discharged to the atmosphere.

Referring to the drawing, I have illustrated a suitable apparatus in which the method may be conducted, although numerous modifications may be employed in effecting the operation and control of the method.

The dryer 5 is a rotating steel cylinder adapted to be driven in any suitable manner from a source of power (not shown). It may, for example, be 6 feet in diameter and 40 feet in length. The copperas is fed from a hopper 6 by conveyor 7 at a uniform rate, and is delivered to the dryer which may be provided with flights 8 to increase the contact of the copperas with the hot gases. A suitable fuel such as gas is supplied from a pipe 9 and branch 10 controlled by a valve 11. This is automatically actuated by a pneumatic controller 12 and droop corrector 13 which is connected to a bulb 14 at the feed end of the dryer. The gas is burned in a combustion chamber 15 and passed through a chamber 16 into which additional air is supplied under control of dampers 17. The flame and hot gases pass into the dryer and travel countercurrent to the copperas as it advances through the dryer. As hereinbefore indicated, the amounts of gas and air are carefully regulated to maintain the desired temperature gradient in the dryer. The temperature at the discharge end is controlled by the quantity of air drawn through the dryer by suction induced by a fan 18 which is connected by a flue 19 to the dryer and by a flue 20 to a cyclone 21 where dust is removed from the gases. A flue 22 permits introduction of warm air under control of a damper 23 which is actuated by a motor 24 controlled by a draft regulator 25, draft adjusting motor 26, droop corrector 27, and potentiometer 28, which is connected to a thermocouple 29. A hand-operated damper 30 is disposed in the flue to which the gases escape from the dryer.

The gases leaving the cyclone are sprayed with water in a flue 31, pass through a coke bed 32, and thence to a stack 33. The water for spraying accumulates in a sump 34 and is recirculated through pipes 35 and 36 by a pump 37 to the spray jet 38.

The dried copperas is delivered by a conveyor 39 to the calciner 60 which is a brick-lined steel cylinder adapted to be rotated through any suitable means from a source of power (not shown). This furnace may be somewhat smaller than the dryer, because of the reduced volume of the material treated. A suitable fuel such as gas is fed from the pipe 9 to the burner 40, air being introduced at the feed end of the calciner through an opening surrounding the burner. The amount of gas is regulated by a valve 41 actuated by a motor 42, which is controlled by a droop corrector 43 and potentiometer 44, the latter being connected to a thermocouple 45 so as to maintain the desired temperature in the calciner.

The air is drawn into the calciner by the draft of a stack 46 connected to a cyclone 47 which is in turn connected by a flue 48 to the discharge end of the calciner. A rotoclone 49 and dust hopper 50 are provided to separate dust from the gases and to return the dust through a pipe 51 to a tank 52 into which the product is discharged. The draft is regulated by a regulator 53 actuated by the motor 42 which in turn controls a motor damper 54 actuating a damper 55 in an air inlet flue 56.

With the regulation as described, it is possible to maintain the desired temperature or gradient control in the calciner and to limit the temperatures to those most effective and adapted to accomplish the desired object.

To ensure proper calcining of the material, it is necessary to maintain a suitable bed thereof in the calciner, and a circular dam 57 is provided at the discharge end to hold back the flow of material so that always there is a substantial body thereof which is constantly agitated, bringing fresh particles into contact with the hot flame and gases and avoiding overheating of the material. The calcined material constantly overflows the dam in proportion to the feed, and the material is delivered to the tank 6 containing water which quenches the hot material and dissolves soluble constituents such as manganese sulphate. A pipe 58 and pump 59 permit withdrawal of the slurry or wet material which may be subsequently treated in any suitable apparatus such as a filter (not shown) to recover the iron oxide product.

The product thus obtained by a continuous or uninterrupted operation of drying and calcining is a red iron oxide of desirable shade having a low manganese content. It is of fine texture, and after washing, drying and grinding, is suitable for use as a pigment and for various other purposes. Owing to the continuous operation and the elimination of handling of the material, the product is less expensive than decomposition products of copperas prepared by batch methods.

Various changes may be made in the structure employed and in the regulating and controlling devices, without departing from the invention or sacrificing the advantages thereof.

I claim:

The method of producing a red oxide of iron of fine texture and purity from commercial copperas which comprises maintaining an uninterrupted flow of finely divided copperas from a source of supply and subjecting the finely divided copperas during transit to drying at regulated temperature sufficiently low that at no stage of the drying operation is the material being treated melted in its water of crystallization and is continuously maintained in its finely divided state, to remove from the copperas six of its seven molecules of water, then transferring the resulting finely divided product to a rotating calcining zone and subjecting it during passage through said zone to heating gases at a regulated temperature sufficiently high to produce ferric oxide, maintaining a bed of material being calcined during calcination in said zone, and rotating the calcining zone at such rate that the material is mixed with the bed and is only momentarily exposed to the heated gases so that overheating is avoided, whereby ferric oxide of a fineness suitable for pigment purposes, without grinding, is obtained.

PETER FIREMAN.